United States Patent
Khair et al.

(10) Patent No.: US 8,725,386 B2
(45) Date of Patent: May 13, 2014

(54) EFFECTIVENESS MODELING AND CONTROL METHODS FOR EGR COOLER

(75) Inventors: Magdi K. Khair, San Antonio, TX (US); Qilong Lu, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 349 days.

(21) Appl. No.: 13/183,206

(22) Filed: Jul. 14, 2011

(65) Prior Publication Data

US 2013/0018566 A1  Jan. 17, 2013

(51) Int. Cl.
*F02D 41/00* (2006.01)
*G06F 17/00* (2006.01)

(52) U.S. Cl.
USPC .............. 701/102; 123/568.11; 73/114.74

(58) Field of Classification Search
USPC .......... 701/102, 108, 112–114; 123/568.11, 123/568.12, 568.16, 568.18, 568.22, 123/568.31, 179.4, 198 D, 198 DB, 198 F, 123/198 DC, 672–674, 677–679, 686, 689; 60/605.2; 73/114.74
See application file for complete search history.

(56) References Cited

U.S. PATENT DOCUMENTS

| | | | | |
|---|---|---|---|---|
| 5,617,726 | A * | 4/1997 | Sheridan et al. | 60/605.2 |
| 6,976,480 | B2 * | 12/2005 | Miyoshi et al. | 123/568.12 |
| 7,281,529 | B2 * | 10/2007 | Lew et al. | 123/568.12 |
| 7,305,976 | B1 * | 12/2007 | Clarke | 123/568.12 |
| 8,234,864 | B2 * | 8/2012 | Easley et al. | 60/602 |
| 8,267,069 | B2 * | 9/2012 | Hsia et al. | 123/568.12 |
| 2009/0125217 | A1 * | 5/2009 | Nam | 701/108 |
| 2009/0266151 | A1 * | 10/2009 | Blumendeller et al. | 73/114.74 |
| 2009/0277431 | A1 * | 11/2009 | Nitzke et al. | 123/568.12 |
| 2010/0051001 | A1 * | 3/2010 | Webb et al. | 123/568.12 |
| 2011/0224948 | A1 * | 9/2011 | Cianflone et al. | 702/183 |
| 2011/0253113 | A1 * | 10/2011 | Roth et al. | 123/568.12 |
| 2012/0323470 | A1 * | 12/2012 | Klingbeil et al. | 701/108 |

* cited by examiner

*Primary Examiner* — John Kwon
*Assistant Examiner* — Johnny H Hoang
(74) *Attorney, Agent, or Firm* — Chowdhury & Georgakis PC; Ann C. Livingston

(57) ABSTRACT

A method of modeling and testing the effectiveness of an EGR cooler. The cooler effectiveness is mathematically modeled as a function of various temperatures and over an operation history that includes one or more engine shut-downs.

15 Claims, 2 Drawing Sheets

EFFECTIVENESS MODELING AND CONTROL METHODS FOR EGR COOLER

TECHNICAL FIELD OF THE INVENTION

This invention relates to exhaust gas recirculation systems, and more particularly to coolers used in such systems.

BACKGROUND OF THE INVENTION

Exhaust gas recirculation (EGR) is a technology used with internal combustion engines to reduce nitric oxides (NOx) in the engine exhaust. In gasoline engines, EGR has the further advantage of extending the knock limit.

The recirculated exhaust is often cooled using liquid or air coolant as a cooling medium to increase its effectiveness in reducing NOx. EGR coolers are designed with a certain heat transfer capacity to achieve the degree of cooling required to maintain the system's thermodynamic effectiveness.

Unfortunately, as exhaust continues to flow through the EGR cooler, deposits form and accumulate on the inside wall of the cooler. These deposits reduce the heat dissipation through the cooler's walls and on to its water jacket, thus reducing the cooler's effectiveness.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a method of modeling a cooler installed on an EGR (exhaust gas recirculation) loop. The model provides an understanding of the factors affecting EGR cooler effectiveness, which are needed to develop a robust EGR system. In particular, the model includes the relationship between EGR cooler effectiveness and engine shutdowns and re-starts.

Figure 1:
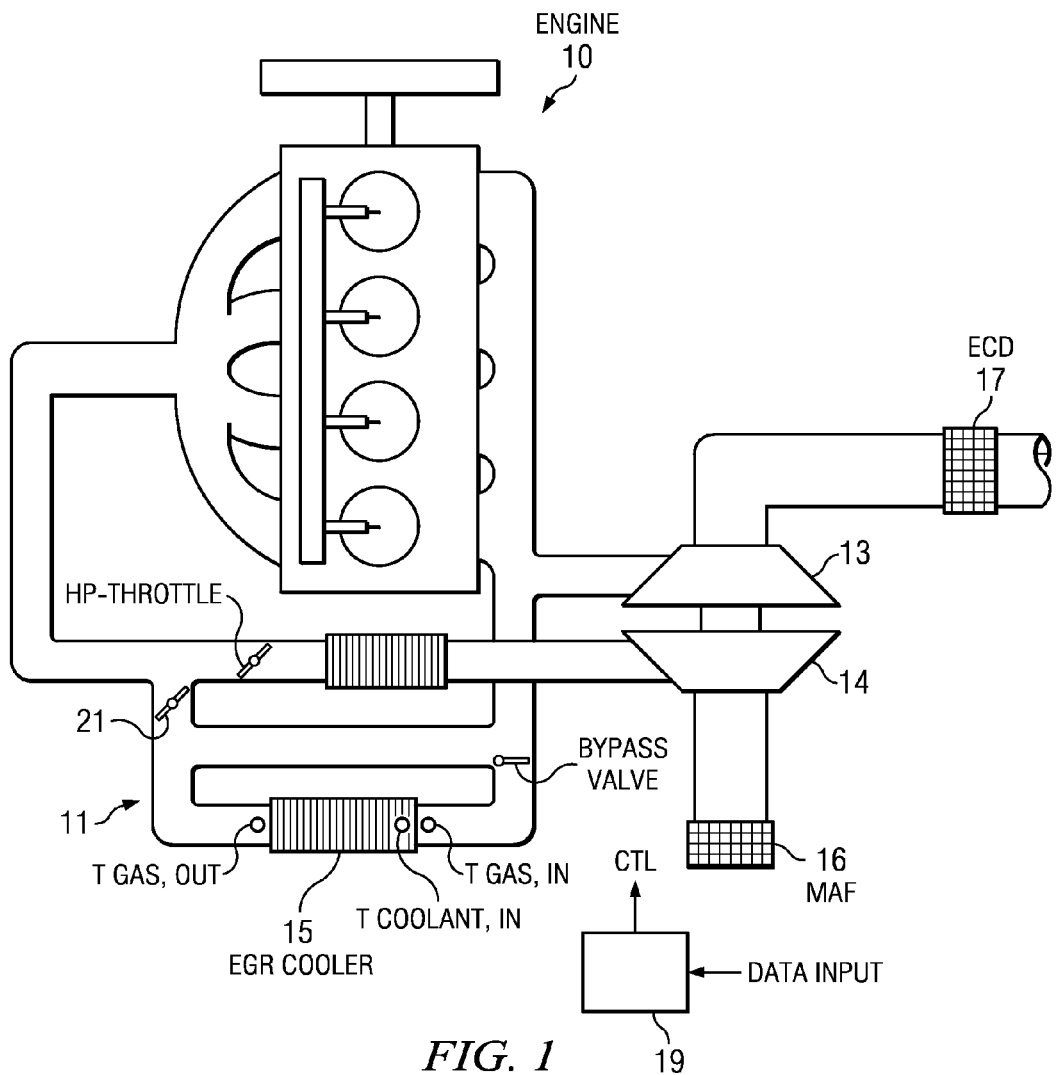
FIG. 1 illustrates an example of an engine having an EGR loop and an EGR cooler, and further illustrates points at which temperature measurements are made or modeled.

FIG. 1 illustrates an engine 10 equipped with an EGR loop 11. In the example of FIG. 1, EGR loop 11 is a high pressure loop. In an engine equipped with a high-pressure EGR loop, the exhaust to be recirculated is extracted upstream of the turbocharger's turbine 13 and routed to the engine intake downstream of the turbocharger's compressor 14. An EGR system may also be implemented as a low-pressure loop, in which the exhaust to be recirculated is extracted downstream of the turbine and introduced to the engine inlet upstream of the compressor.

Both types of EGR systems may use a cooler, such as EGR cooler 15. The cooler 15 cools the recirculated exhaust gas prior to the gas being reintroduced into the engine. By cooling the gas, the combustion temperature is reduced and NOX also as NOX is formed at higher temperatures. Thus, EGR cooler 15 assists in maintaining the recirculated exhaust at an optimum temperature, and thereby operating the engine at appropriate temperatures and mass flow rates. The temperature of the recirculated exhaust is also referred to herein as the "EGR temperature".

EGR cooler 15 may be one of various types of liquid or air exchange coolers, such as liquid-to-liquid or gas-to-liquid heat exchanger type coolers. For example, the EGR cooler 15 may run hot exhaust gasses through channels while allowing liquid coolant to run on the outside of those channels. Commonly used types of EGR coolers are water-cooled and air-cooled coolers.

Engine 10 is further equipped with a mass air flow (MAF) sensor 16 at the air intake. The exhaust into the tailpipe may be treated with one or more exhaust aftertreatment devices, identified in FIG. 1 as emissions control device 17.

The EGR system has a control unit 19, which may be dedicated to EGR control or may be part of a more comprehensive engine control unit (ECU). Control unit 19 may be implemented with conventional processing and memory devices. As explained below, tasks of control unit 19 relevant to this description may include control of EGR cooler 15, EGR valve 21, or other aspects of the process used to provide recirculated exhaust at a desired rate and temperature.

Figure 2:
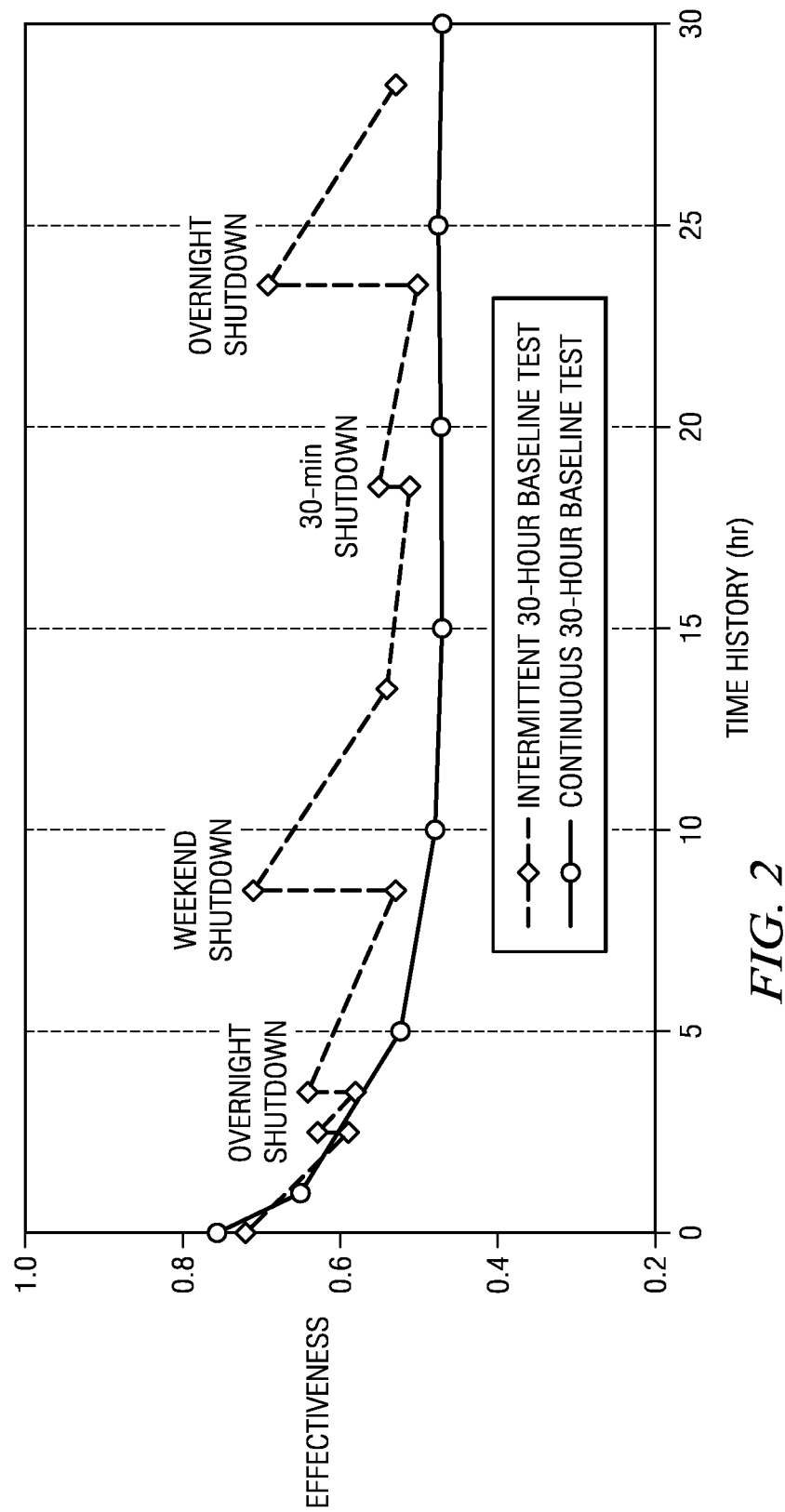
FIG. 2 illustrates how EGR cooler effectiveness is modeled over time.

FIG. 2 illustrates, for effectiveness of an EGR cooler, the difference between intermittent and continuous engine operation. The calculation of "cooler effectiveness" values from various temperature values is explained below.

In both a continuous and an intermittent operation tests, the test EGR cooler began as a new (unused) cooler. The solid-line plot is of cooler effectiveness during 30 hours of continuous operation of the engine (and the cooler). The dashed-line plot is of cooler effectiveness during 30 hours of intermittent operation, including engine shutdowns of various durations. As indicated, in both tests, the EGR cooler has a significant loss in effectiveness within the first 10 to 15 hours of its operation.

The following Equation (1) represents EGR flow, its specific heat at constant pressure, and its temperature, which are control parameters governing the ability of the EGR to absorb heat resulting from the engine combustion process.

$$Q' = m' \times c_p (T_{comb} - T_{EGR}), \tag{1}$$

where Q' is the heat absorbed by the EGR, m' is the EGR flow rate, $c_p$ is the specific heat under constant pressure, $T_{comb}$ is the combustion temperature of the bulk gas, and $T_{EGR}$ is the EGR temperature.

Referring again to FIG. 1, EGR flow is controlled by modulating the position of an EGR control valve 21. This function is normally controlled by a strategy stored in the form of control tables in the control unit 19. At typical exhaust gas temperatures, the specific heat at constant pressure is generally fixed. EGR is usually cooled using EGR cooler 15, with engine coolant as cooling medium to increase the heat absorption from the combustion process thus reducing NOx. The two effective parameters in controlling NOx through EGR are EGR flow and EGR temperature.

The following Equation (2) defines EGR cooler effectiveness as a function of various temperatures:

$$\varepsilon = \frac{Q_{actual}}{Q_{max}} = \frac{T_{g,in} - T_{g,out}}{T_{g,in} - T_{coolant,in}}, \tag{2}$$

where $\varepsilon$ is the EGR cooler effectiveness, $Q_{actual}$ is the actual heat dissipated to the coolant, $Q_{max}$ is the available cooling capacity, $T_{g,in}$ is the EGR temperature at the inlet of the cooler, $T_{g,out}$ is the EGR temperature at the outlet of the cooler, and $T_{coolant,in}$ is the temperature of the coolant at the inlet of the EGR cooler.

If cooler effectiveness is stable, control of the EGR system is reduced to the task of controlling EGR flow. Referring again to FIG. 2, continuous operation of the engine results in more stable cooler effectiveness than does intermittent operation. When the engine is shut down then restarted, cooler effectiveness initially recovers before deteriorating again to a lower value.

Varying cooler effectiveness can be compensated to some extent by varying EGR flow. However, unstable cooler effectiveness leads to erratic EGR temperature, which in turn leads to unpredictable EGR system performance that continuously requires adjustment of the EGR control valve 21. This action often leads to greater engine pumping losses when EGR temperature is not adequately reduced requiring engine throttling to achieve the proper NOx reduction. For stable performance of the EGR system, it is important to understand instability of EGR cooler performance exhibited in the form of the recovery and deterioration modeled by intermittent engine operation.

A phenomenon of EGR cooler effectiveness recovery is observed during engine start-up following a period of shutdown. A plausible explanation for this phenomenon is related to the temperature of the coolant, the temperature difference between the exhaust gas recirculated and the coolant, and the exhaust gas constituents. It is anticipated that the greater the temperature difference between the exhaust gas and the coolant, the greater the formation of condensate.

As for the exhaust gas constituents in the case of an internal combustion engine burning hydrocarbon fuel, the presence of sulfur compounds such as sulfur trioxide ($SO_3$) and nitric oxides (NOx) is expected. The former is the result of the fuel sulfur content and its oxidation through the combustion process and/or the reaction of combustion-generated $SO_2$ reacting in aftertreatment components such as oxidation catalysts leading to the formation of $SO_3$. NOx ($NO+NO_2$) is formed primarily during the combustion process by reacting nitrogen and oxygen at elevated temperatures. The presence of both SO3 and NOx as well as condensate or water formed through the combustion process create conditions for the formation of sulfuric and nitric acid, both of which have corrosive properties.

The process of EGR cooler recovery begins as the engine is shut down, when residual exhaust gases remain in the EGR cooler passages (pipes). These gases are laden with sulfuric and nitric acid and dissolve the soot/lube oil cake or deposit accumulated on the inside surface of the pipes carrying the recirculated exhaust gas.

Upon restarting the engine and during the warm up period, a considerable amount of condensate is formed based on the temperature differential between the exhaust gas and the coolant temperature. The increase in condensate and its mixing with the acidic components of the exhaust continues the "cleaning" of the exhaust gas flow passages. This process helps to return the heat exchange characteristics of the EGR cooler 15 to its original performance.

Following the warm up cycle, a reduction in the formation of condensate can be expected based on the reduced temperature difference between the exhaust gas and the coolant. Therefore, the "cleaning" process is reduced and deposits once again build on the walls of the gas passages inside the EGR cooler 15, leading again to reduced cooler effectiveness.

Referring again to FIG. 1 and Equation (2), a computer-implemented method of modeling an EGR cooler is achieved by providing three temperature measurements during cooler operation: the exhaust gas temperature at the inlet of cooler 15 (gas temperature in), the exhaust gas temperature at the outlet of cooler 15 (gas temperature out), and the coolant temperature, typically measured at the inlet of the cooler (cooler temperature in). These "measurements" may be actual measurements of an operating EGR cooler. Or, for purposes such as simulation and prototyping, all or some of the temperature values may be in the form of hypothetical values.

Regardless of the mode (actual or hypothetical) of input data, Equation (2) may be modified to reflect cooler effectiveness over time. To this end, cooler effectiveness, $\epsilon$, is represented as a function of the following variables:

$\epsilon$=f (shutdown time, EGR cooler in T, EGR cooler out T, coolant T, ambient conditions and other conditions that enhance water formation)

For model-based cooler effectiveness control, shutdown time values come from observing the behavior of the cooler over a certain operational history. The three temperatures are measured parameters. These inputs provide a basis from which water-forming potential (condensate in the cooler) can be predicted. More specifically, Equation (2) can be rewritten as a function of cooler effectiveness over time, with special factors and/or terms that represent the increased effectiveness after a shutdown and the effect of ambient conditions.

In implementation, for modeling an EGR cooler, a computer may be programmed to receive temperature input values and to calculate cooler effectiveness values. Measured or hypothetical temperature values are provided to the model, and used to evaluate the effectiveness of a real or modeled cooler.

Referring also again to FIG. 2, the EGR cooler is operated (actually or by computer simulation) over a time period referred to as an "operation history". The operation history includes at least one and more typically, several shut-off periods of varying duration and restarts, where the duration of the shut-off period is not included in the cooler's "operation history" time count. The shut-off periods may be brief, i.e., minutes or longer, i.e., hours, and include at least one shut-off of sufficient duration to result in cold-start engine conditions.

The above described EGR cooler effectiveness model may also be incorporated into an EGR control strategy implemented by control unit 19. Cooler effectiveness is modeled as a function of temperatures, shut off time, and other parameters as described above. Ambient conditions, such as temperature and humidity, can be used as trim functions to diagnose the EGR cooler and determine how best to control EGR to maintain its flow and temperature for stable performance and consistency in NOx reduction over time. Depending on a current value of cooler effectiveness, as modified by any trim functions, control unit 19 may be programmed to calculate flow control values and to deliver control signals to EGR valve 21.

The above-described modeling method provides a plausible explanation for mechanisms causing EGR cooler effectiveness instability. The insight gained from the model will lead to the development of systems that can maintain high EGR cooler effectiveness, avoid the introduction of acidic materials into the engine cylinder, and provide longer engine life.

What is claimed is:

1. A computer-implemented method of modeling the operation of an EGR cooler installed in an exhaust gas recirculation (EGR) loop, comprising:

storing, in memory of a computer, temperature data representing the following three temperature measurements during an operation history of the cooler: temperature of the exhaust gas at the inlet of the cooler (gas temperature in), temperature of the exhaust gas at the outlet of the cooler (gas temperature out), and temperature of the coolant (coolant temperature in);

wherein the operation history of the cooler includes at least one shut-down period;

using a processor of the computer to access the temperature data and to perform the following tasks: for a succession of measurement times during the operation history: subtracting the gas temperature out from the gas temperature in, thereby calculating an effectiveness numerator; subtracting the coolant temperature in from the gas temperature in, thereby calculating an effectiveness denominator; and dividing the numerator by the denominator, thereby calculating an effectiveness value for each measurement time;

storing, in memory of the computer, the effectiveness values for the measurement times; and displaying, using a display in data communication with the computer, a graphical representation of the effectiveness values as a function of the measurement times, thereby displaying a graphical representation of the operation of the EGR cooler over time.

2. The method of claim 1, wherein the shutdown period results in cold start engine conditions.

3. The method of claim 1, wherein the operation history includes multiple shutdown periods of varying durations.

4. The method of claim 1, wherein the EGR loop is a high pressure loop.

5. The method of claim 1, wherein the EGR loop is a low pressure loop.

6. The method of claim 1, wherein the EGR cooler is a water-cooled heat exchange type cooler.

7. The method of claim 1, wherein the EGR cooler is an air-cooled heat exchange type cooler.

8. The method of claim 1, wherein at least the gas temperature in is a measured value.

9. The method of claim 1, wherein at least the gas temperature out is a measured value.

10. The method of claim 1, wherein at least the coolant temperature in is a measured value.

11. The method of claim 1, wherein at least the gas temperature in is a hypothetical value.

12. The method of claim 1, wherein at least the gas temperature out is a hypothetical value.

13. The method of claim 1, wherein at least the coolant temperature in is a hypothetical value.

14. A method of using an EGR control unit to control an exhaust gas recirculation (EGR) loop of an internal combustion engine, the EGR loop having an EGR cooler and an EGR valve, comprising:

storing, in memory of the control unit, a process for calculating EGR flow values as a function of a cooler effectiveness values;

acquiring the following temperature measurements, using temperature sensors, during operation of the cooler: temperature of the exhaust gas at the inlet of the cooler (gas temperature in), temperature of the exhaust gas at the outlet of the cooler (gas temperature out), and temperature of the coolant (coolant temperature in);

using a processor of the control unit to perform the following tasks: receiving the temperature measurements, calculating an EGR cooler effectiveness value as a function of any prior shutdown time, gas temperature in, gas temperature out, and coolant temperature in; accessing the memory; calculating an EGR flow value based on the results of the cooler effectiveness value; delivering an EGR flow control signal to the EGR valve; and repeating the above steps during operation of the engine.

15. The method of claim 14, wherein the EGR flow value is further based on ambient conditions, such as temperature and humidity.

* * * * *